(12) United States Patent
Gupta et al.

(10) Patent No.: US 12,327,104 B2
(45) Date of Patent: Jun. 10, 2025

(54) AGGREGATION OF DATA FOR DISTRIBUTED MANAGEMENT FRAMEWORK

(71) Applicant: American Megatrends International, LLC, Duluth, GA (US)

(72) Inventors: Chitrak Gupta, Kolkata (IN); Venkatesan Balakrishnan, Chennai (IN); Shirley Heby, Chennai (IN); Manikandan Palaniappan, Chennai (IN)

(73) Assignee: AMERICAN MEGATRENDS INTERNATIONAL, LLC, Duluth, GA (US)

( * ) Notice: Subject to any disclaimer, the term of this patent is extended or adjusted under 35 U.S.C. 154(b) by 217 days.

(21) Appl. No.: 17/979,340

(22) Filed: Nov. 2, 2022

(65) Prior Publication Data

US 2024/0143305 A1 May 2, 2024

(51) Int. Cl.
*G06F 8/60* (2018.01)
*G06F 8/65* (2018.01)
*G06F 9/445* (2018.01)

(52) U.S. Cl.
CPC ............ *G06F 8/65* (2013.01); *G06F 9/44505* (2013.01)

(58) Field of Classification Search
CPC ... G06F 8/65; G06F 9/44505; H04L 43/0817; H04L 41/0853
See application file for complete search history.

(56) References Cited

U.S. PATENT DOCUMENTS

| | | | |
|---|---|---|---|
| 9,124,636 B1* | 9/2015 | Rathor | H04L 63/02 |
| 10,193,997 B2 | 1/2019 | Poblete et al. | |
| 2018/0041604 A1 | 2/2018 | Poblete et al. | |
| 2020/0341929 A1* | 10/2020 | Lambert | G06F 13/4221 |
| 2020/0409813 A1 | 12/2020 | Gupta et al. | |
| 2021/0119891 A1 | 4/2021 | Mundt et al. | |
| 2021/0240497 A1 | 8/2021 | Thulasi et al. | |
| 2021/0389955 A1 | 12/2021 | Li et al. | |
| 2021/0392166 A1 | 12/2021 | Hu et al. | |

OTHER PUBLICATIONS

Hongwei Liu et al., "A Secure and Efficient USB-based In-band Communication Interface between Host and BMC," 2022 IEEE, retrieved online Apr. 17, 2025, pp. 228-237. Retrieved from the Internet: < URL: https://ieeexplore.ieee.org/stamp/stamp.jsp?tp=&arnumber=10070633>. (Year: 2022).*

* cited by examiner

*Primary Examiner* — Hanh Thi-Minh Bui
(74) *Attorney, Agent, or Firm* — TROUTMAN PEPPER LOCKE LLP; Tim Tingkang Xia, Esq.

(57) ABSTRACT

In an aspect of the disclosure, a method, a computer-readable medium, and a computer system are provided. The computer system includes a primary BMC. The primary BMC determines one or more management endpoints that are to be managed by the primary BMC. The primary BMC manages a host and each of the management endpoints manages a respective device serving the host. The primary BMC determines a mapping of communication interfaces between the primary BMC and the one or more management endpoints. The primary BMC determines, based on the mapping, a first communication interface between a first management endpoint and the primary BMC. The primary BMC collects, from the first management endpoint, device operational data of a first device managed by the first management endpoint.

20 Claims, 9 Drawing Sheets

```
{
  "@odata.type": "#AggregationService.v1_0_1.AggregationService",
  "@odata.id": "/redfish/v1/AggregationService/",
  "Id": "AggregationService",
  "Description": "Aggregation Service",
  "Name": "Aggregation Service",
  "ServiceEnabled": true,
  "Status": {
    "Health": "OK",
    "HealthRollup": "OK",
    "State": "Enabled"
  },
  "Aggregates": {
    "@odata.id": "/redfish/v1/AggregationService/Aggregates"
  }
}
```

FIG. 4

```
"@odata.type": "#AggregateCollection.AggregateCollection",
"@odata.id": "/redfish/v1/AggregationService/Aggregates",
"Description": "Collection for Aggregate resource instances",
"Members": [{
    "@odata.id": "/redfish/v1/AggregationService/Aggregates/AggregateInterface1"
}, {
    "@odata.id": "/redfish/v1/AggregationService/Aggregates/AggregateInterface2"
}],
"Members@odata.count": 2,
"Name": "AggregateCollection"
```

FIG. 5

```
600
{
    "@odata.type": "#Aggregate.v1_0_1.Aggregate",
    "@odata.id": "/redfish/v1/AggregationService/Aggregates/AggregateInterface1",
    "Id": "AggregateInterface1",
    "Name": "Aggregate Interface1 BMCs",
    "Description": "Aggregate BMCs using VLAN Interface",
    "ElementsCount": 3,
    "Elements": [
        {
            "@odata.id": "/redfish/v1/Systems/Sub-BMC1"
        },
        {
            "@odata.id": "/redfish/v1/Systems/Sub-BMC2"
        },
        {
            "@odata.id": "/redfish/v1/Systems/Sub-BMC3"
        }
    ]
}
```

FIG. 6

```
{
  "@odata.type": "#Aggregate.v1_0_1.Aggregate",
  "@odata.id": "/redfish/v1/AggregationService/Aggregates/AggregateInterface2",
  "Id": "AggregateInterface2",
  "Name": " Aggregate Interface2 BMCs ",
  "Description": "Aggregate BMCs using PCIe Interface",
  "ElementsCount": 2,
  "Elements": [
    {
      "@odata.id": "/redfish/v1/Systems/Sub-BMC4"
    },
    {
      "@odata.id": "/redfish/v1/Systems/Sub-BMC5"
    }
  ]
}
```

FIG. 7

AGGREGATION OF DATA FOR DISTRIBUTED MANAGEMENT FRAMEWORK

BACKGROUND

Field

The present disclosure relates generally to computer systems, and more particularly, to techniques of aggregation of management data for distributed system and abstraction of underlying hardware interfaces.

Background

The statements in this section merely provide background information related to the present disclosure and may not constitute prior art.

Considerable developments have been made in the arena of server management. An industry standard called Intelligent Platform Management Interface (IPMI), described in, e.g., "IPMI: Intelligent Platform Management Interface Specification, Second Generation," v.2.0, Feb. 12, 2004, defines a protocol, requirements and guidelines for implementing a management solution for server-class computer systems. The features provided by the IPMI standard include power management, system event logging, environmental health monitoring using various sensors, watchdog timers, field replaceable unit information, in-band and out of band access to the management controller, SNMP traps, etc.

A component that is normally included in a server-class computer to implement the IPMI standard is known as a Baseboard Management Controller (BMC). A BMC is a specialized microcontroller embedded on the motherboard of the computer, which manages the interface between the system management software and the platform hardware. The BMC generally provides the "intelligence" in the IPMI architecture.

The BMC may be considered as an embedded-system device or a service processor. A BMC may require a firmware image to make them operational. "Firmware" is software that is stored in a read-only memory (ROM) (which may be reprogrammable), such as a ROM, programmable read-only memory (PROM), erasable programmable read-only memory (EPROM), electrically erasable programmable read-only memory (EEPROM), etc.

Not all host systems have the hardware capability for service processors to access storages of component devices (e.g., a Serial Peripheral Interface (SPI) storages) directly or communicate with the component devices. Therefore, there is a need for a mechanism for updating firmware of the component devices conveniently.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and a computer system are provided. The computer system includes a primary baseboard management controller (BMC). The primary BMC determines one or more management endpoints that are to be managed by the primary BMC. The primary BMC manages a host and each of the management endpoints manages a respective device serving the host. The primary BMC determines a mapping of communication interfaces between the primary BMC and the one or more management endpoints. The primary BMC determines, based on the mapping, a first communication interface between a first management endpoint and the primary BMC. The primary BMC collects, from the first management endpoint, device operational data of a first device managed by the first management endpoint.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 4 is a diagram illustrating a schema defining an aggregation service.

FIG. 5 is a diagram illustrating a schema defining an aggregate collection.

FIG. 6 is a diagram illustrating a schema defining an aggregate.

FIG. 7 is a diagram illustrating a schema defining another aggregate.

DETAILED DESCRIPTION

Figure 1:
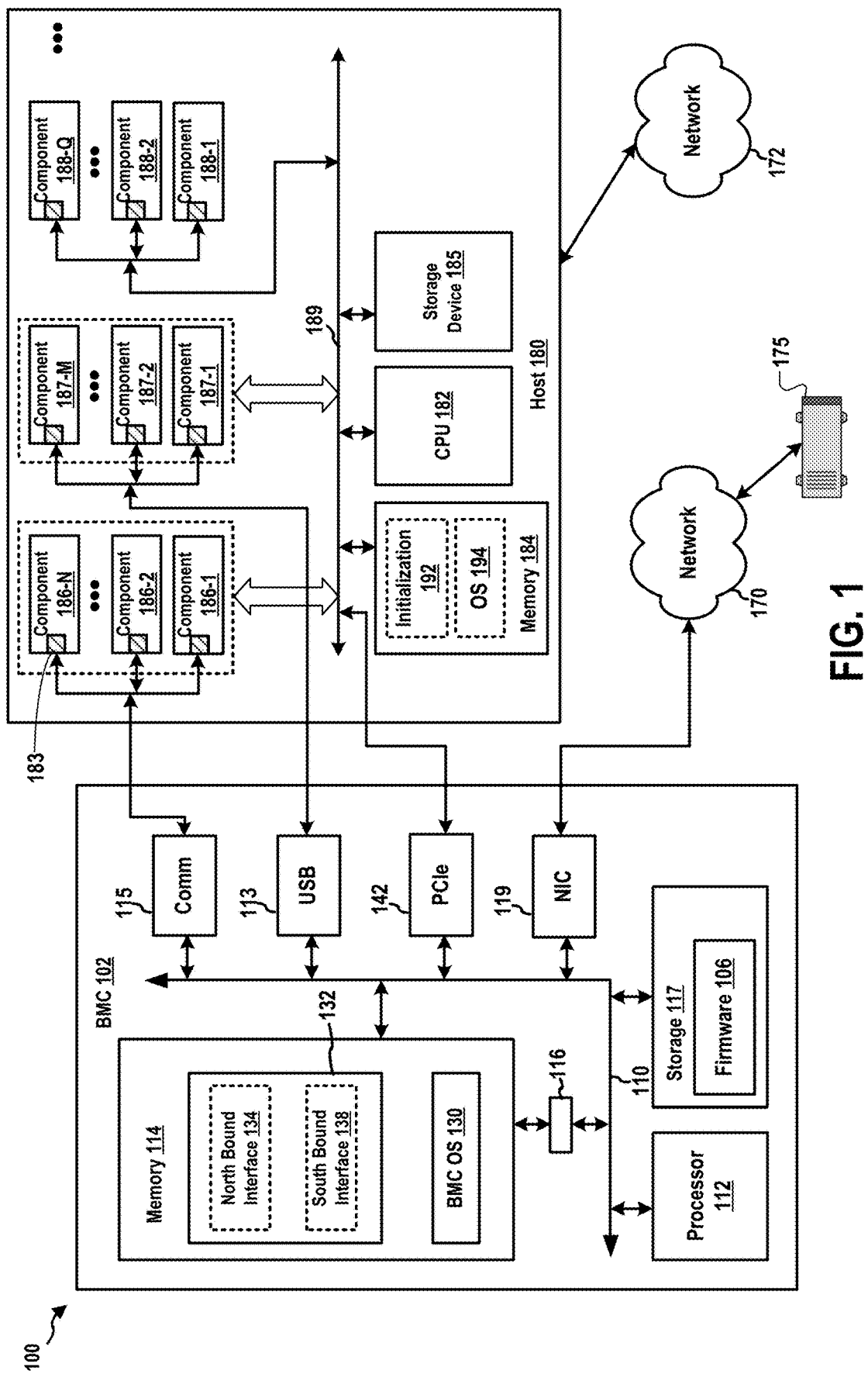
FIG. 1 is a diagram illustrating a computer system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of computer systems will now be presented with reference to various apparatus and methods. These apparatus and methods will be described in the following detailed description and illustrated in the accompanying drawings by various blocks, components, circuits, processes, algorithms, etc. (collectively referred to as elements). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a processing system that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating a computer system 100. In this example, the computer system includes, among other devices, a BMC 102 and a host computer 180. The BMC 102 has, among other components, a processing unit 112, a memory 114, a memory driver 116, a storage 117, a network interface card 119, a Universal Serial Bus (USB) interface 113, a PCIe port 142, and other communication interfaces 115.

The communication interfaces 115 may include a keyboard controller style (KCS), a server management interface chip (SMIC), a block transfer (BT) interface, a system management bus system interface (SSIF), an inter-integrated circuit (i²c) interface, and/or other suitable communication interface(s).

Further, as described infra, the BMC 102 supports IPMI and provides an IPMI interface between the BMC 102 and the host computer 180. The IPMI interface may be implemented over one or more of the USB interface 113, the network interface card 119, and the communication interfaces 115.

In certain configurations, one or more of the above components may be implemented as a system-on-a-chip (SoC). For examples, the processing unit 112, the memory 114, the memory driver 116, the storage 117, the network interface card 119, the USB interface 113, and/or the communication interfaces 115 may be on the same chip. In addition, the memory 114, the processing unit 112, the memory driver 116, the storage 117, the communication interfaces 115, and/or the network interface card 119 may be in communication with each other through a communication channel 110 such as a bus architecture.

The BMC 102 may store BMC firmware 106 in the storage 117. The storage 117 may utilize a non-volatile, non-transitory storage media. When the processing unit 112 executes the BMC firmware 106, the processing unit 112 loads code and data of the BMC firmware 106 into the memory 114. In particular, the BMC firmware 106 can provide in the memory 114 a BMC OS 130 (operating system) and service components 132. The service components 132 include, among other components, a north bound interface component 134, and south bound interface component 138. Further, the service components 132 may be implemented as a service stack. As such, the BMC firmware 106 can provide an embedded system to the BMC 102.

The BMC 102 may be in communication with the host computer 180 through the USB interface 113, the network interface card 119, the communication interfaces 115, and/or the IPMI interface.

The host computer 180 includes a host CPU 182, a host memory 184, a storage device 185, component devices 186-1 to 186-N, component devices 187-1 to 187-M, and component devices 188-1 to 188-Q, etc. Those component devices can be any suitable type of hardware components that are installed on the host computer 180, including additional CPUs, memories, and storage devices. As a further example, the component devices 186-1 to 186-N can also include Peripheral Component Interconnect Express (PCIe) devices, a redundant array of independent disks (RAID) controller, and/or a network controller. Further, those component devices can include hardware components of a computer 402 shown in FIG. 4. Each component is connected to a system bus 189 of the host computer 180.

Further, each of the component devices 186-1 to 186-N, the component devices 187-1 to 187-M, and the component devices 188-1 to 188-Q may be managed or monitored by a management endpoint 183. The management endpoint 183 is a secondary BMC, which may be a standalone BMC or a micro BMC hosted on the field programmable gate array (FPGA), a GPU, an infrastructure processing unit (IPU), or a NIC, etc. The BMC 102 functions as a primary BMC.

In this example, the management endpoint 183 of the component devices 186-1 to 186-N are in communication with the south bound interface component 138 executed on the BMC 102 through an i²c interface (which is a part of the communication interfaces 115).

In this example, the management endpoints 183 of the component devices 187-1 to 187-M are in communication with the south bound interface component 138 executed on the BMC 102 through the USB interface 113. In particular, a virtual LAN may be implemented over the USB connections between the BMC 102 and the management endpoints 183 of the component devices 187-1 to 187-M. As such, the BMC 102 and those management endpoints 183 can communicate with each other according to a network protocol in the VLAN.

Further, in this example, the component devices 188-1 to 188-Q are PCIe devices and are connected with the system bus 189 via a PCIe link. The PCIe port 142 of the BMC 102 is also connected to the system bus 189 through a PCIe link. Therefore, the BMC 102 are in communication with the management endpoints 183 of the component devices 188-1 to 188-Q through the PCIe links and the system bus 189.

After the host computer 180 is powered on, the host CPU 182 loads an initialization component 192 from the storage device 185 into the host memory 184 and executes the initialization component 192. In one example, the initialization component 192 is a basic input/output system (BIOS). In another example, the initialization component 192 implements a Unified Extensible Firmware Interface (UEFI). UEFI is defined in, for example, "Unified Extensible Firmware Interface Specification Version 2.6, dated January, 2016," which is expressly incorporated by reference herein in their entirety. As such, the initialization component 192 may include one or more UEFI boot services.

The initialization component 192, among other things, performs hardware initialization during the booting process (power-on startup). For example, when the initialization component 192 is a BIOS, the initialization component 192 can perform a Power On System Test, or Power On Self Test, (POST). The POST is used to initialize the standard system components, such as system timers, system DMA (Direct Memory Access) controllers, system memory controllers, system I/O devices and video hardware (which are part of the component devices 186-1 to 186-N). As part of its initialization routine, the POST sets the default values for a table of interrupt vectors. These default values point to standard interrupt handlers in the memory 114 or a ROM. The POST also performs a reliability test to check that the system hardware, such as the memory and system timers, is functioning correctly. After system initialization and diagnostics, the POST surveys the system for firmware located on non-volatile memory on optional hardware cards (adapters) in the system. This is performed by scanning a specific address space for memory having a given signature. If the signature is found, the initialization component 192 then initializes the device on which it is located. When the initialization component 192 includes UEFI boot services, the initialization component 192 may also perform procedures similar to POST.

After the hardware initialization is performed, the initialization component 192 can read a bootstrap loader from a predetermined location from a boot device of the storage device 185, usually a hard disk of the storage device 185, into the host memory 184, and passes control to the bootstrap loader. The bootstrap loader then loads an OS 194 into the host memory 184. If the OS 194 is properly loaded into memory, the bootstrap loader passes control to it. Subsequently, the OS 194 initializes and operates. Further, on certain disk-less, or media-less, workstations, the adapter firmware located on a network interface card re-routes the pointers used to bootstrap the operating system to download the operating system from an attached network.

The service components 132 of the BMC 102 may manage the host computer 180 and is responsible for managing and monitoring the server vitals such as temperature and voltage levels. The service stack can also facilitate administrators to remotely access and manage the host computer 180. In particular, the BMC 102 may manage the host computer 180 in accordance with IPMI. The service components 132 may receive and send IPMI messages to the host computer 180 through the IPMI interface.

Further, the host computer 180 may be connected to a data network 172. In one example, the host computer 180 may be a computer system in a data center. Through the data network 172, the host computer 180 may exchange data with other computer systems in the data center or exchange data with machines on the Internet.

The BMC 102 may be in communication with a communication network 170 (e.g., a local area network (LAN)). In this example, the BMC 102 may be in communication with the communication network 170 through the network interface card 119. Further, the communication network 170 may be isolated from the data network 172 and may be out-of-band to the data network 172. In certain configurations, the communication network 170 may not be connected to the Internet. In certain configurations, the communication network 170 may be in communication with the data network 172 and/or the Internet. In addition, through the communication network 170, a remote device 175 may communicate with the BMC 102. For example, the remote device 175 may send IPMI messages to the BMC 102 over the communication network 170.

Figure 2:
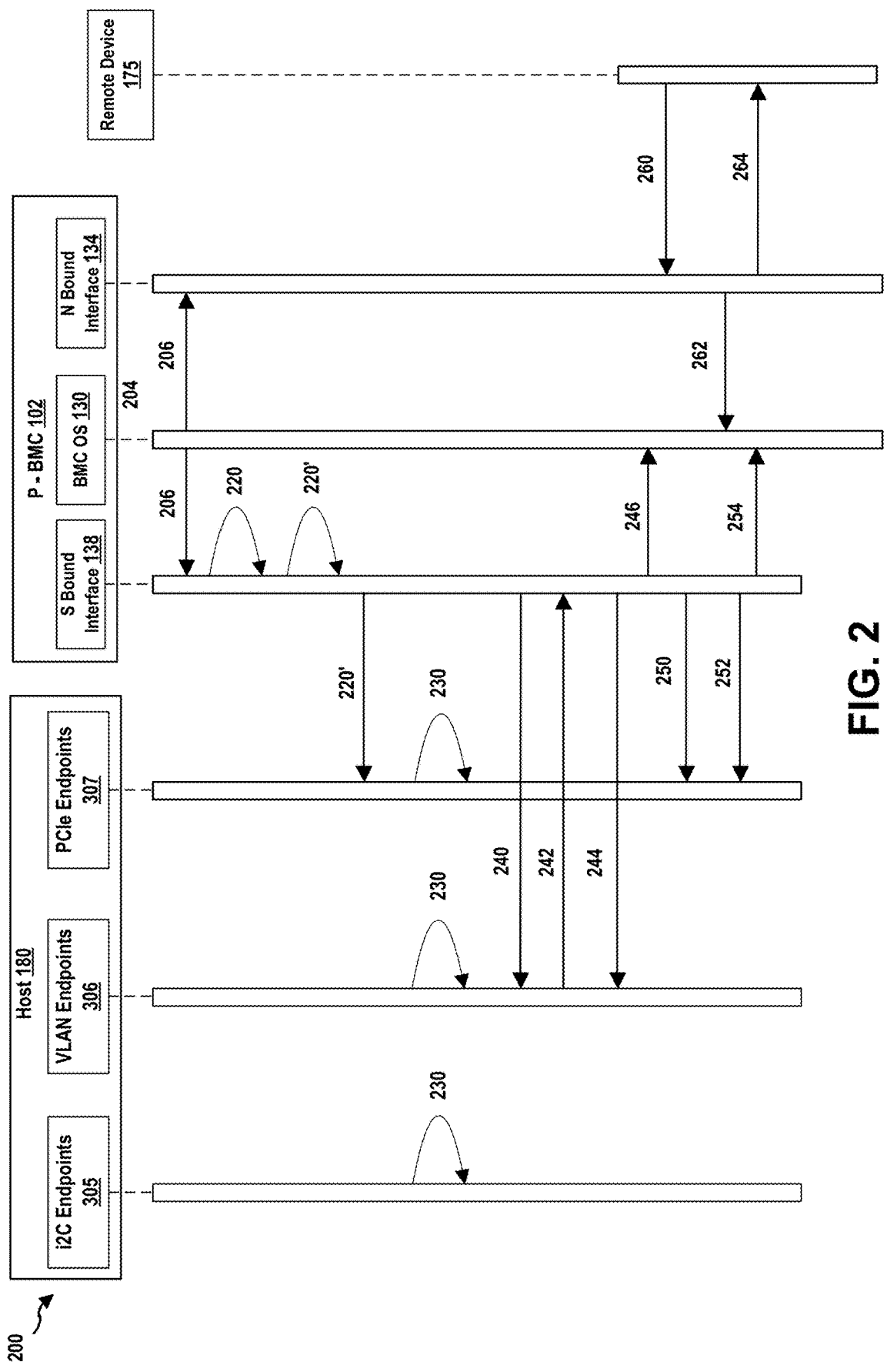
FIG. 2 is a diagram a sequence of procedures performed by a BMC for aggregation of management data.
Figure 3:
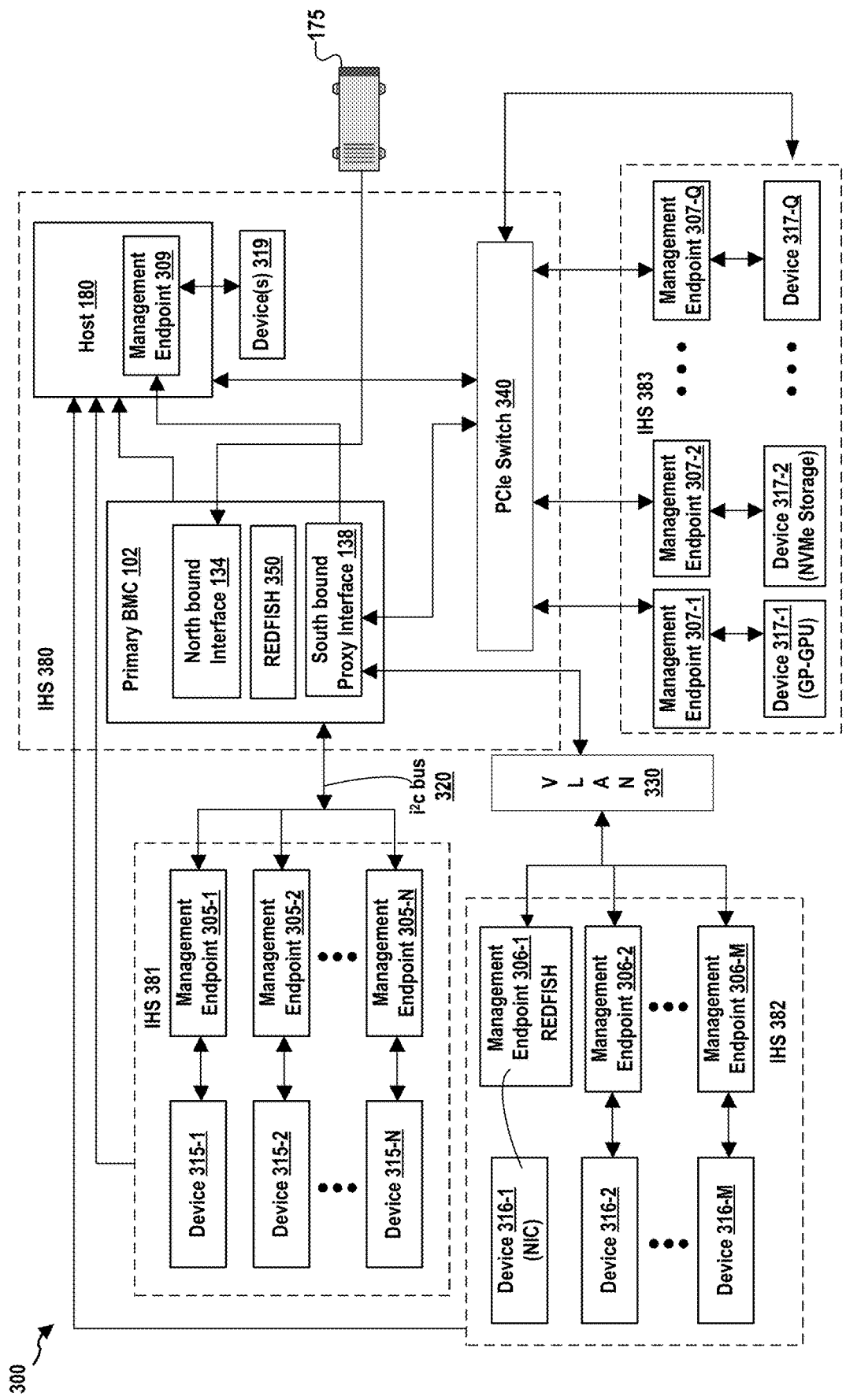
FIG. 3 is a diagram illustrating an example of configurations of the BMC and one or more management endpoints.

FIG. 2 is a diagram 200 illustrating a sequence of procedures performed by the BMC 102 for aggregation of management. FIG. 3 is a diagram illustrating another example of configurations of the BMC 102 and one or more management endpoints.

Further, in certain configurations, the host 180 and the BMC 102 belong to a same information handling system (IHS) 380. In certain configurations, the IHS 380 also include component devices 315-1 to 315-N, component devices 316-1 to 316-M, and component devices 317-1 to 317-Q, which are managed by management endpoints 305-1 to 305-N, management endpoints 306-1 to 306-M, and management endpoints 307-1 to 307-Q, respectively.

In certain configurations, the component devices 315-1 to 315-N belong to an IHS 381, the component devices 316-1 to 316-M belong to an IHS 382, and component devices 317-1 to 317-Q belong to an IHS 383.

The host computer 180 includes a component device(s) 319. A management endpoint 309, which is on the host computer 180 and may be a containerized application, collects system information of the component device(s) 319 and provides the information to the BMC 102.

As described supra, the BMC 102 runs the south bound interface component 138 and the north bound interface component 134. Further, the BMC 102 may implement a REDFISH service in accordance with, for example, "Redfish Specification, Document Identifier: DSP0266, Date: 2022 Sep. 15, Version: 1.16.0" published by Distributed Management Task Force (DMTF).

FIG. 4 is a diagram illustrating a schema 400 defining an aggregation service provided by the south bound interface component 138, which provides aggregation functions. The aggregation functions are applied to one or more aggregates.

FIG. 5 is a diagram illustrating a schema 500 defining an aggregate collection that includes one or more aggregates controlled by the aggregation service. In this example, the aggregation collection includes two aggregates: Aggregate Interface 1 and Aggregate Interface 2.

FIG. 6 is a diagram illustrating a schema 600 defining an aggregate: Aggregate Interface 1. This aggregate Interface 1 may be the VLAN interface 330 and includes 3 interfaces for communicating with Sub-BMC1, Sub-BMC2, and Sub-BMC3 (e.g., the management endpoints 306-1 to 306-3).

FIG. 7 is a diagram illustrating a schema 700 defining an aggregate: Aggregate Interface 2. This aggregate Interface 2 may be the PCIe switch 340 and includes 2 interfaces for communicating with Sub-BMC4, Sub-BMC5, and Sub-BMC3 (e.g., the management endpoints 307-1 to 307-2).

In procedure 204, the BMC 102 loads and initiates the BMC OS 130. In procedure 206, the BMC OS 130 initiates the south bound interface component 138 and the north bound interface component 134. As described infra, the BMC OS 130 utilizes the north bound interface component 134 to communicate with the host computer 180 and the remote device 175 and utilizes the south bound interface component 138 to communicate with one or more management endpoints.

Further, in this example, the management endpoints 305-1 to 305-N communicate with the south bound interface component 138 through an i²c bus 320. The management endpoints 306-1 to 306-M communicate with the south bound interface component 138 through a VLAN interface 330 that are emulated on top of, for example, a USB interface. The management endpoints 307-1 to 307-Q communicate with the south bound interface component 138 through a PCIe switch 340. The south bound interface component 138 may support various transfer protocols such as IPMI, PLDM, Redfish, SNMP, etc.

In a first configuration, the south bound interface component 138 is coded with, at build time, a mapping of the management endpoints that are in communication with the south bound interface component 138 as well as the interfaces between the south bound interface component 138 and the management endpoints. For example, upon initiation, the south bound interface component 138 may, in procedure 220, read a configuration file that are stored in the firmware 106 to determine the mapping of the management endpoints and the interfaces used for communication.

In a second configuration, the south bound interface component 138 may, at run time in procedure 220', discovers the management endpoints through a discovery protocol. In this example, the south bound interface component 138 detects the PCIe switch 340 and then, through PCIe protocols, discovers the management endpoints 307-1 to 307-Q and the component devices 317-1 to 317-Q that are connected to the PCIe switch 340.

Further, the south bound interface component 138 may read a configuration file provide at run time to determine the mapping of the management endpoints and the interfaces used for communication. In this example, the south bound interface component 138 determines the mapping and interfaces associated with the management endpoints 305-1 to 305-N and the management endpoints 306-1 to 306-M according to configurations specified in the run time configuration file.

In procedure 230, each management endpoint operates and collects operational data and health data from the component device being managed. Each management endpoint provides methods for the south bound interface component 138 to receive notifications and to retrieve operational data in accordance with the communication interfaces between the south bound interface component 138 and management endpoint. For example, the management endpoints that are connected through PCIe interfaces or i²c interfaces may support polling from the south bound interface component 138 to provide to the south bound interface component 138 notifications of new data available at the management endpoints. Further, the management endpoints may implement PULL methods that can be called by the south bound interface component 138 to retrieve data from the management endpoints. The management endpoints that are connected through VLANs may implement an event notification mechanism through which the south bound interface component 138 may use to subscribe certain events. Further, the management endpoints may run a REDFISH server, which provide APIs through which the south bound interface component 138 may obtain data over the VLANs.

In one example, the component device 316-1 may be a network interface card (NIC). The management endpoint 306-1 manages the NIC and may have implemented an event subscription mechanism. In procedure 240, the south bound interface component 138 may subscribe to a NIC connectivity loss event generated at the management endpoint 306-1. In procedure 242, when the NIC loses its connectivity, the management endpoint 306-1 accordingly generates operation/health data regarding the connectivity loss. Further, the management endpoint 306-1 generates a NIC connectivity loss event and notifies the south bound interface component 138 about the event. In procedure 244, in response to receiving the notification from the management endpoint 306-1, the south bound interface component 138 may use an API method provided by the REDFISH server at the management endpoint 306-1 to retrieve operational/health data. In procedure 246, the south bound interface component 138 sends the retrieved operational/health data to the BMC OS 130, which in turn stores the operational/health data at the BMC 102.

In one example, the PCIe component device 317-1 may be a general-purpose graphics processing unit (GP-GPU). The PCIe component device 317-2 may be a non-volatile memory express (NVMe) storage. In procedure 250, the south bound interface component 138 may poll the management endpoints 307-1 periodically to determine whether new operational/health data are available. For example, the management endpoint 307-1 may monitors the temperature of the GP-GPU and accordingly generates temperature data. In procedure 252, once the south bound interface component 138 determines that new operational/health data are available at the management endpoint 307-1, the south bound interface component 138 may use a method provided by the management endpoint 307-1 to retrieve those data. In particular, the communications between the south bound interface component 138 and the management endpoint 307-1 may use PCIe Vendor Defined Messages (VDMs). In procedure 254, the south bound interface component 138 sends the retrieved operational/health data to the BMC OS 130, which in turn stores the operational/health data at the BMC 102.

In procedure 260, an administrator may operate a remote device 175 to send a request (e.g., through a REDFISH service) to the north bound interface component 134 of the BMC 102. The request is for obtaining operational/health data stored on the BMC 102. In procedure 262, the north bound interface component 134 obtains the requested data from the BMC OS 130. In procedure, the north bound interface component 134 send the requested data to the remote device 175.

Figure 8:
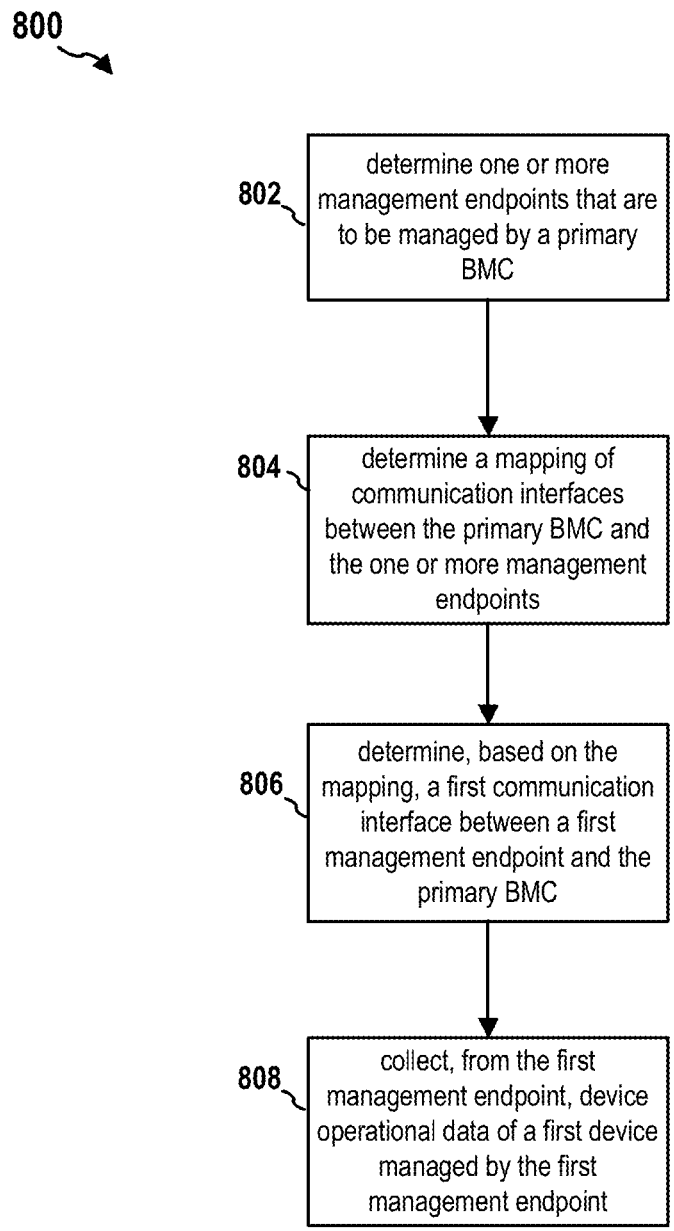
FIG. 8 is a flow chart of a method (process) for aggregating data from one or more management endpoints.

FIG. 8 is a flow chart 800 of a method (process) for aggregating data from one or more management endpoints. The method may be performed by a primary BMC (e.g., the BMC 102). At operation 802, the primary BMC determines one or more management endpoints that are to be managed by the primary BMC. The primary BMC manages a host and each of the management endpoints manages a respective device serving the host. At operation 804, the primary BMC determines a mapping of communication interfaces between the primary BMC and the one or more management endpoints. At operation 806, the primary BMC determines, based on the mapping, a first communication interface between a first management endpoint and the primary BMC. At operation 808, the primary BMC collects, by the primary BMC and from the first management endpoint, device operational data of a first device managed by the first management endpoint.

In certain configurations, to determine the mapping of the communication interfaces, the primary BMC discovers, at the primary BMC, the communication interfaces through a discovering process. In certain configurations, to determine the mapping of the communication interfaces, the primary BMC obtains, at run time, a configuration file from another device. The primary BMC reads, from the configuration file, configurations specifying the mapping. In certain configurations, to determine the mapping of the communication interfaces, the primary BMC reads configurations programmed in firmware of the primary BMC. The configurations specify the mapping.

In certain configurations, the primary BMC determines a communication protocol to be used by the primary BMC to communicate with the first management endpoint through the first communication interface. In certain configurations, the first device is a general purpose graphics processing unit (GP GPU) and the first management endpoint is a secondary BMC or a micro BMC.

In certain configurations, to collect the device operational data, the primary BMC subscribes a target event generated by the first management endpoint. The primary BMC receives, from the first management endpoint, a notification that the target event has occurred. The primary BMC requests, in response to the notification, the device operational data of the first device from management endpoint from the first management endpoint.

In certain configurations, to collect the device operational data, the primary BMC implements, by the primary BMC, a pull method with the first management endpoint to retrieve the device operational data. The primary BMC calls the pull method to retrieve the device operational data.

In certain configurations, to collect the device operational data, the primary BMC polls, by the primary BMC, the first management endpoint to determine whether the first management endpoint has the device operational data available for the primary BMC. The primary BMC reads the device operational data from the management endpoint.

In certain configurations, a group of the one or more management endpoints communicates with the primary BMC through a virtual local area network (VLAN) interface. In certain configurations, a group of the one or more management endpoints communicates with the primary BMC through an Inter-Integrated Circuit (i$^2$c) interface. In certain configurations, a group of the one or more management endpoints communicates with the primary BMC through a Peripheral Component Interconnect Express (PCIe) interface.

Figure 9:
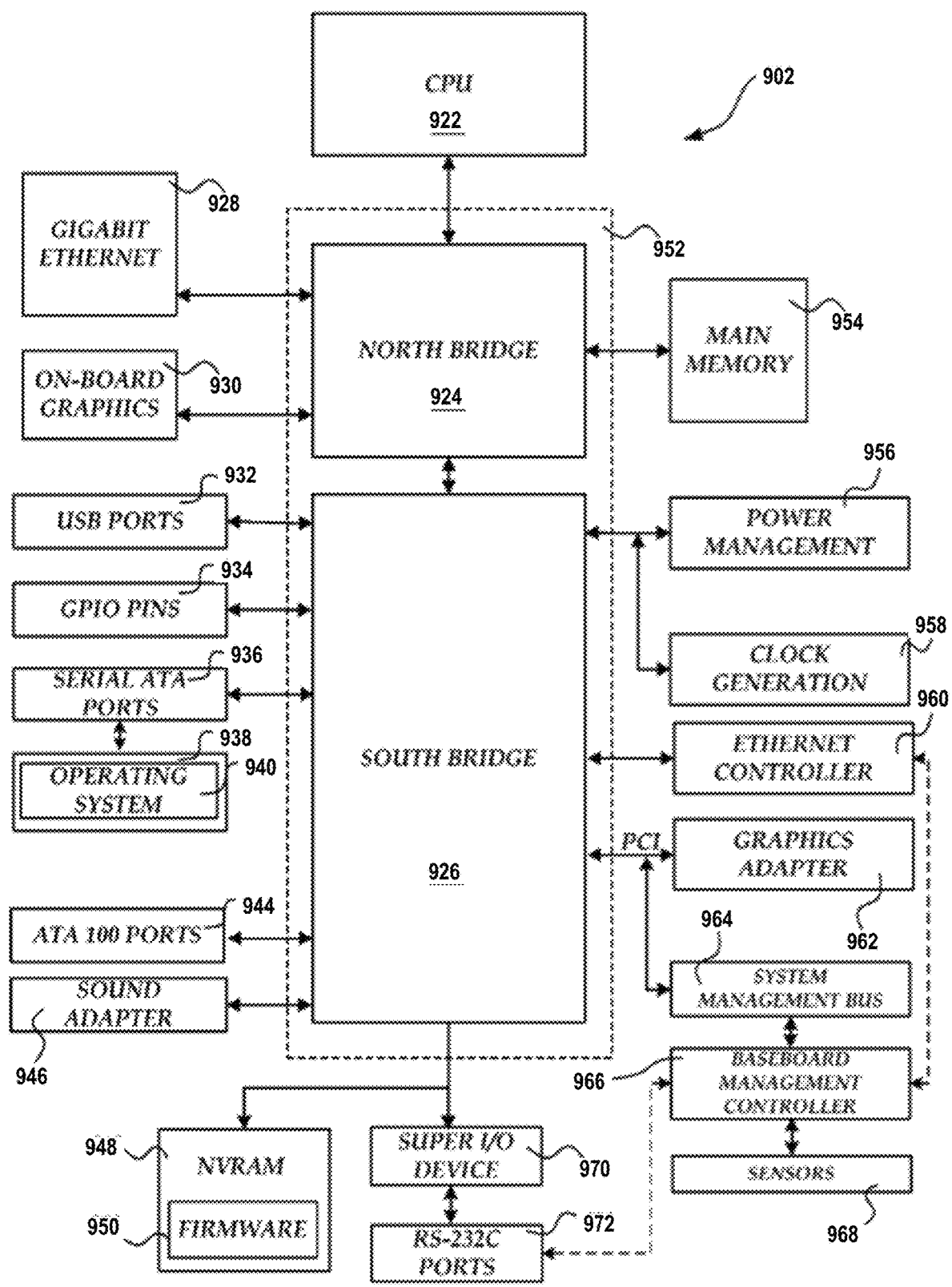
FIG. 9 shows a computer architecture for a computer.

FIG. 9 and the following discussion are intended to provide a brief, general description of one suitable computing environment in which aspects of the embodiments described herein may be implemented. In particular, FIG. 9 shows a computer architecture for a computer 902 that may be utilized to embody the host computer 180, as described supra. It should be appreciated that the computer architecture shown in FIG. 9 is merely illustrative and that other types of computers and computing devices may also be utilized to implement aspects of the embodiments presented herein.

While aspects presented herein include computer programs that execute in conjunction with the execution of an operating system, those skilled in the art will recognize that the embodiments may also be implemented in combination with other program modules and/or hardware devices. As described herein, computer programs include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

The computer 902 shown in FIG. 9 includes a baseboard, or "motherboard," which is a printed circuit board to which a multitude of components or devices may be connected by way of a system bus or other electrical communication path. In one illustrative embodiment, a CPU 922 operates in conjunction with a chipset 952. The CPU 922 is a standard central processor that performs arithmetic and logical operations necessary for the operation of the computer. The server computer 902 may include a multitude of CPUs 922.

The chipset 952 includes a north bridge 924 and a south bridge 926. The north bridge 924 provides an interface between the CPU 922 and the remainder of the computer 902. The north bridge 924 also provides an interface to a random access memory ("RAM") used as the main memory 954 in the computer 902 and, possibly, to an on-board graphics adapter 930. The north bridge 924 may also include functionality for providing networking functionality through a gigabit Ethernet adapter 928. The gigabit Ethernet adapter 928 is capable of connecting the computer 902 to another computer via a network. Connections which may be made by the network adapter 928 may include LAN or WAN connections. LAN and WAN networking environments are commonplace in offices, enterprise-wide computer networks, intranets, and the internet. The north bridge 924 is connected to the south bridge 926.

The south bridge 926 is responsible for controlling many of the input/output functions of the computer 902. In particular, the south bridge 926 may provide one or more USB ports 932, a sound adapter 946, an Ethernet controller 960, and one or more GPIO pins 934. The south bridge 926 may also provide a bus for interfacing peripheral card devices such as a graphics adapter 962. In one embodiment, the bus comprises a PCI bus. The south bridge 926 may also provide a system management bus 964 for use in managing the various components of the computer 902. Additional details regarding the operation of the system management bus 964 and its connected components are provided below.

The south bridge 926 is also operative to provide one or more interfaces for connecting mass storage devices to the computer 902. For instance, according to an embodiment, the south bridge 926 includes a serial advanced technology attachment ("SATA") adapter for providing one or more SATA ports 936 and an ATA 100 adapter for providing one or more ATA 100 ports 944. The SATA ports 936 and the ATA 100 ports 944 may be, in turn, connected to one or more mass storage devices such as the SATA disk drive 938 storing an operating system 940 and application programs.

As known to those skilled in the art, an operating system 940 comprises a set of programs that control operations of a computer and allocation of resources. An application program is software that runs on top of the operating system software, or other runtime environment, and uses computer resources to perform application specific tasks desired by the user. According to one embodiment of the invention, the operating system 940 comprises the LINUX operating system. According to another embodiment of the invention the operating system 940 comprises an operating system within the WINDOWS family of operating systems from MICROSOFT CORPORATION. According to another embodiment, the operating system 940 comprises the UNIX, LINUX, or SOLARIS operating system. It should be appreciated that other operating systems may also be utilized.

The mass storage devices connected to the south bridge 926, and their associated computer storage media, provide non-volatile storage for the computer 902. Although the description of computer storage media contained herein refers to a mass storage device, such as a hard disk or CD-ROM drive, it should be appreciated by those skilled in the art that computer storage media can be any available media that can be accessed by the computer 902.

By way of example, and not limitation, computer storage media may comprise volatile and non-volatile, removable and non-removable media implemented in any method or technology for storage of information such as computer-readable instructions, data structures, program modules or other data. Computer storage media also includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

According to embodiments, a low pin count ("LPC") interface may also be provided by the south bridge 926 for connecting a "Super I/O" device 970. The Super I/O device 970 is responsible for providing a number of input/output ports, including a keyboard port, a mouse port, a serial interface 972, a parallel port, and other types of input/output ports. The LPC interface may also connect a computer storage media such as a ROM or a flash memory such as a NVRAM 948 for storing the firmware 950 that includes program code containing the basic routines that help to start up the computer 902 and to transfer information between elements within the computer 902.

As described briefly above, the south bridge 926 may include a system management bus 964. The system management bus 964 may include a BMC 966. The BMC 966 may be the BMC 102. In general, the BMC 966 is a microcontroller that monitors operation of the computer system 902. In a more specific embodiment, the BMC 966 monitors health-related aspects associated with the computer system 902, such as, but not limited to, the temperature of one or more components of the computer system 902, speed of rotational components (e.g., spindle motor, CPU Fan, etc.) within the system, the voltage across or applied to one or more components within the system 902, and the available or used capacity of memory devices within the system 902. To accomplish these monitoring functions, the BMC 966 is communicatively connected to one or more components by way of the management bus 964. In an embodiment, these components include sensor devices 968 for measuring various operating and performance-related parameters within the computer system 902. The sensor devices 968 may be either hardware or software based components configured or programmed to measure or detect one or more of the various operating and performance-related parameters.

It should also be appreciated that the computer 902 may comprise other types of computing devices, including handheld computers, embedded computer systems, personal digital assistants, and other types of computing devices known to those skilled in the art. It is also contemplated that the computer 902 may not include all of the components shown in FIG. 9, may include other components that are not explicitly shown in FIG. 9, or may utilize an architecture completely different than that shown in FIG. 9.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of operating a computer system, comprising:
   determining, at a primary baseboard management controller (BMC), one or more management endpoints that are to be managed by the primary BMC, wherein the primary BMC manages a host computer, wherein each of the one or more management endpoints comprises a secondary BMC or micro-BMC that is external to a host operating system (OS) of the host computer and manages a respective device serving the host computer;
   determining, at the primary BMC, a mapping of out-of-band communication interfaces between the primary BMC and the one or more management endpoints;
   determining, at the primary BMC and based on the mapping, a first out-of-band communication interface between a first management endpoint and the primary BMC;
   collecting, by the primary BMC and from the first management endpoint, device operational data of a first device managed by the first management endpoint over the first out-of-band communication interface that bypasses the host OS; and providing, by the primary BMC, an aggregation service configured to communicate northbound with a remote client using a north bound interface and to communicate southbound with the one or more management endpoints using a south bound interface, wherein the south bound interface supports multiple different southbound communication protocols and acts as a client to the one or more management endpoints, and wherein the aggregation service aggregates the device operational data collected from the one or more management endpoints and provides the aggregated data to the remote client via the north bound interface.

2. The method of claim 1, further comprising:
determining a communication protocol to be used by the primary BMC to communicate with the first management endpoint through the first out-of-band communication interface.

3. The method of claim 1, wherein the determining the mapping of the out-of-band communication interfaces includes discovering, at the primary BMC, the out-of-band communication interfaces through a discovering process.

4. The method of claim 1, wherein the determining the mapping of the out-of-band communication interfaces includes
obtaining, at run time, a configuration file from another device; and
reading, from the configuration file, configurations specifying the mapping.

5. The method of claim 1, wherein the determining the mapping of the out-of-band communication interfaces includes reading configurations programmed in firmware of the primary BMC, the configurations specifying the mapping.

6. The method of claim 1, wherein the first device is a general purpose graphics processing unit (GP GPU).

7. The method of claim 1, wherein the collecting the device operational data including
subscribing, by the primary BMC, a target event generated by the first management endpoint;
receiving, at the primary BMC and from the first management endpoint, a notification that the target event has occurred; and
requesting, at the primary BMC and in response to the notification, the device operational data of the first device from management endpoint from the first management endpoint.

8. The method of claim 1, wherein the collecting the device operational data including
implementing, by the primary BMC, a pull method with the first management endpoint to retrieve the device operational data; and
calling the pull method to retrieve the device operational data.

9. The method of claim 1, wherein the collecting the device operational data including
polling, by the primary BMC, the first management endpoint to determine whether the first management endpoint has the device operational data available for the primary BMC; and
reading the device operational data from the management endpoint.

10. The method of claim 1, wherein a group of the one or more management endpoints communicates with the primary BMC through a virtual local area network (VLAN) interface.

11. The method of claim 1, wherein a group of the one or more management endpoints communicates with the primary BMC through an Inter-Integrated Circuit ($i^2c$) interface.

12. The method of claim 1, wherein a group of the one or more management endpoints communicates with the primary BMC through a Peripheral Component Interconnect Express (PCIe) interface.

13. An apparatus, the apparatus being primary baseboard management controller (BMC), comprising:
a memory; and
at least one processor coupled to the memory and configured to:
determine, at the primary BMC, one or more management endpoints that are to be managed by the primary BMC, wherein the primary BMC manages a host computer, wherein each of the one or more management endpoints comprises a secondary BMC or micro-BMC that is external to a host operating system (OS) and manages a respective device serving the host computer;
determine, at the primary BMC, a mapping of out-of-band communication interfaces between the primary BMC and the one or more management endpoints;
determine, at the primary BMC and based on the mapping, a first out-of-band communication interface between a first management endpoint and the primary BMC;
collect, by the primary BMC and from the first management endpoint, device operational data of a first device managed by the first management endpoint over the first out-of-band communication interface that bypasses the host OS; and
provide, by the primary BMC, an aggregation service configured to communicate northbound with a remote client using a north bound interface and to communicate southbound with the one or more management endpoints using a south bound interface, wherein the south bound interface supports multiple different southbound communication protocols and acts as a client to the one or more management endpoints, and wherein the aggregation service aggregates the device operational data collected from the one or more management endpoints and provides the aggregated data to the remote client via the north bound interface.

14. The apparatus of claim 13, wherein the at least one processor is further configured to:
determine a communication protocol to be used by the primary BMC to communicate with the first management endpoint through the first out-of-band communication interface.

15. The apparatus of claim 13, wherein to determine the mapping of the out-of-band communication interfaces, the at least one processor is further configured to discover, at the primary BMC, the out-of-band communication interfaces through a discovering process.

16. The apparatus of claim 13, wherein to determine the mapping of the out-of-band communication interfaces, the at least one processor is further configured to:
obtain, at run time, a configuration file from another device; and read, from the configuration file, configurations specifying the mapping.

17. The apparatus of claim 13, wherein to determine the mapping of the out-of-band communication interfaces, the at least one processor is further configured to read configurations programmed in firmware of the primary BMC, the configurations specifying the mapping.

18. The apparatus of claim 13, wherein the first device is a general purpose graphics processing unit (GP GPU).

19. The apparatus of claim 13, wherein to collect the device operational data, the at least one processor is further configured to:
   subscribe, by the primary BMC, a target event generated by the first management endpoint;
   receive, at the primary BMC and from the first management endpoint, a notification that the target event has occurred; and
   request, at the primary BMC and in response to the notification, the device operational data of the first device from management endpoint from the first management endpoint.

20. The apparatus of claim 13, wherein to collect the device operational data, the at least one processor is further configured to:
   implement, by the primary BMC, a pull apparatus with the first management endpoint to retrieve the device operational data; and
   call the pull apparatus to retrieve the device operational data.

* * * * *